United States Patent [19]

Bell, Jr.

[11] 3,737,615

[45] June 5, 1973

[54] CURRENT AND FREQUENCY CONTROL SYSTEM FOR ELECTRICAL DISCHARGE MACHINING APPARATUS

[75] Inventor: Oliver A. Bell, Jr., Mooresville, N.C.

[73] Assignee: Elox Inc., Davidson, N.C.

[22] Filed: Sept. 13, 1971

[21] Appl. No.: 179,664

[52] U.S. Cl. ............................................219/69 C
[51] Int. Cl. ............................................B23p 1/08
[58] Field of Search .............219/69 C, 69 G, 69 P, 219/69 R, 69 S, 69 V

[56] References Cited

UNITED STATES PATENTS 3,590,317  6/1971  Sennowitz.....................219/69 C X
3,213,258  10/1965  Ferguson........................219/69 P Primary Examiner—R. F. Staubly
Attorney—Robert C. Hauke, Ernest I. Gifford, Claude A. Patalidis et al.

[57] ABSTRACT

An electrical discharge machining circuit of independently variable machining pulse frequency and current magnitude as set by machining pulse on-time. A current control system is employed to limit current to the gap to a safe level in accordance with each preselected frequency and current magnitude combination. Included to accomplish the control function are a plurality of gating means connected in a logic system and employing the resistor-transistor configuration.

14 Claims, 5 Drawing Figures

CURRENT AND FREQUENCY CONTROL SYSTEM FOR ELECTRICAL DISCHARGE MACHINING APPARATUS

BACKGROUND OF THE INVENTION

Circuits for electrical discharge machining apparatus typically incorporate a number of electronic output switches which are operated singly or parallel connected in banks to provide machining power pulses across a dielectric filled machining gap. Material is removed from an electrically conductive workpiece coincident with the gap dielectric breakdown each time a machining power pulse passes across the gap. In order to insure repeatability and controllability of machining operation, the power supply circuit generally incorporates a pulsing means or pulse generator which operates the electronic output switches, turning them on and off at precisely controllable frequencies and at controllable current magnitude as maintained by pulse on-time duration. The use of solid state devices, such as transistors, as the electronic output switches gives rise to a problem since these devices are being switched back and forth between a non-conductive state and a conductive state at relatively high frequencies, particularly in finishing operations. The power dissipated during this switching, added to the power generated while the transistor is in its conductive state, may cause excessive heating and increase the possibility of a secondary breakdown occurring. To prevent possible damage to the transistor from this heating effect and to prevent damage to the gap elements, it is necessary in some way to limit the current passed through the transistor yet still permitting operation at the high frequency desired. Various prior art systems have failed to directly solve this problem. Those systems whereby power is interrupted "after the fact" and after the transistor has actually failed are not satisfactory.

BRIEF DESCRIPTION OF THE INVENTION

The present invention incorporates a current control system which takes its inputs from simple deck type wafer switches which serve as selectors or as combined selectors and read-out devices that respond to the frequency and the current magnitude preset for the electrical discharge machining apparatus. A variable impedance means comprising a plurality of different magnitude resistors are placed in circuit, either separately or together, in predetermined combination with the transistor principal electrodes proximate the gap to limit the current to the degree necessary as the switching frequency and pulse current magnitude, i.e. on-time, are adjusted. This current limiting is accomplished through the operation of a logic circuit which includes a plurality of NOR type gating means. It is important that while the control system limits the maximum current where this is necessary it also permits normal operation for lower frequencies. The system according to the present invention takes inputs from its own pulser control and then connects the appropriate magnitude resistor combinations in the gap circuit.

The control system is adaptable to receive inputs from another machining power supply such as when the electrical discharge machining apparatus is being operated in a dual system, such as where two power supplies are used to provide machining power pulses to a single machining gap. It will be seen that the present invention is not limited to EDM circuits employing transistors or other solid state switching devices, but is applicable to any EDM circuit using electronic switches to deliver power pulses to the gap. The term "electronic switch" is used to mean any electronic control device having three or more electrodes comprising at least two principal or power conducting electrodes acting to control current flow in the power circuit, the conductivity of the power circuit being controlled by a control electrode within the switch whereby the conductivity of the power circuit is controlled statically or electrically without the movement of any mechanical elements within the switch. Included within this definition by way of illustration but not limitation are vacuum tubes, transistors, semi-conductor controlled switches, and the like.

BRIEF DESCRIPTION OF THE DRAWINGS

The present invention, its operational features and its advantages will be understood from the following specification taken together with the drawings in which like numerals are used to refer to identical parts throughout the several views, and wherein:

FIG. 1a is a schematic drawing showing the variable impedance network 24 of FIG. 1.

DETAILED DESCRIPTION OF THE PREFERRED EMBODIMENT

Figure 1:
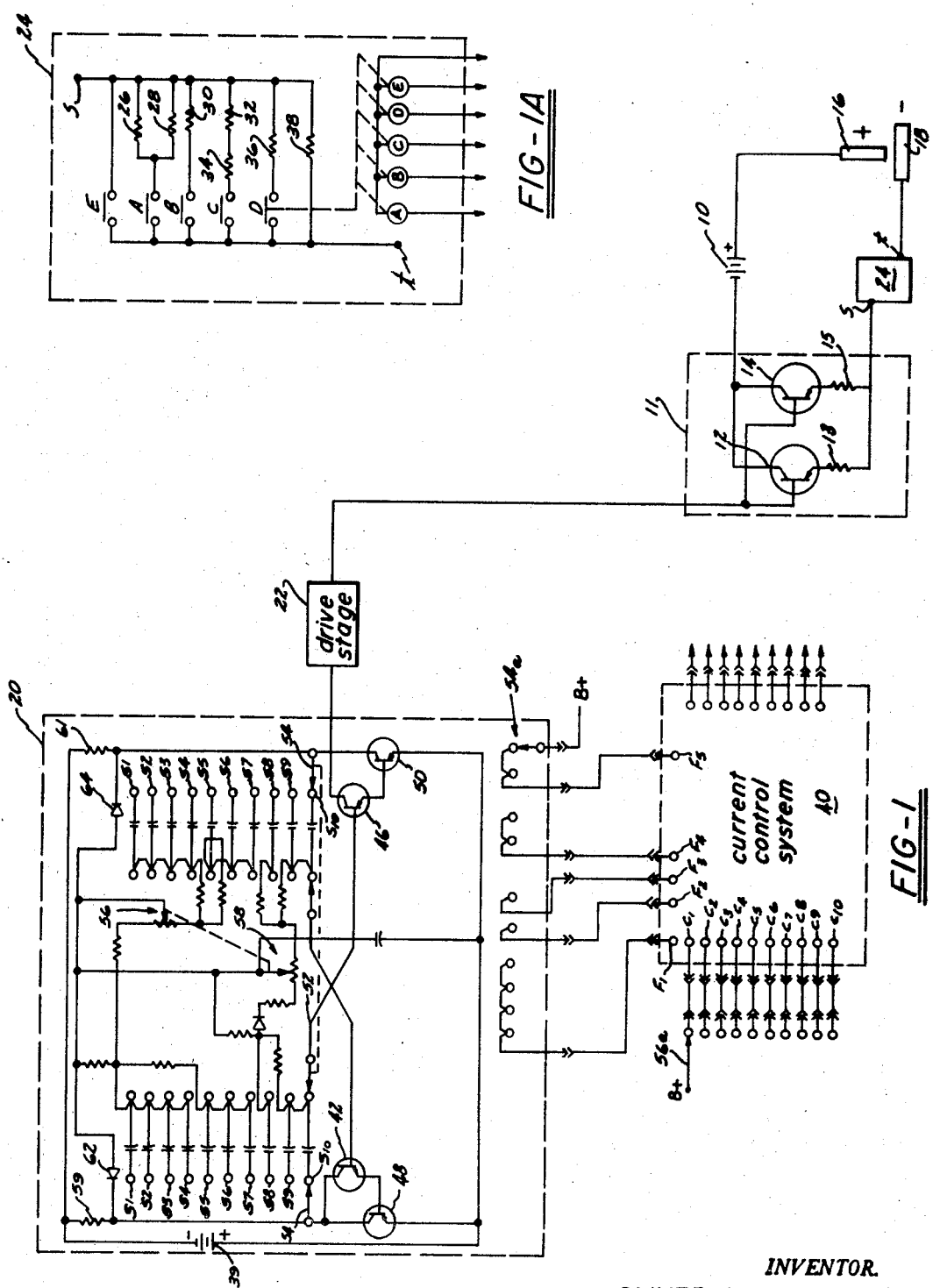
FIG. 1 is a combined schematic and block diagrammatic showing of an electrical discharge machining power supply incorporating the present invention.

FIG. 1 shows the basic parts of an electrical discharge machining power supply apparatus which include a main machining DC power source 10 and a bank 11 of electronic output switches, such as transistors 12 and 14, which have their principal electrodes coupled between the machining power source 10 and the machining gap which includes an electrode 16 and a workpiece 18. Series resistors 13 and 15 are connected between the respective emitters of the transistors 12 and 14 and the negative gap element — the workpiece 18. Also included in the electrical discharge machining power supply is a pulsing means for the electronic output switches 12, 14 indicated generally by the numeral 20. In this case, the pulse generator shown is an astable multivibrator of the type well known in the electrical discharge machining art. Connected intermediate the multivibrator 20 and the control electrode of the output transistors 12, 14 are one or more drive stages 22, which stages are used to shape and amplify the triggering pulses being provided to operate the output transistors 12, 14. The gap circuit will also be seen to include a variable impedance means 24 connected between the positive terminal of the machining power source 10 and the electrode 16. A plurality of resistors 26, 28, 30, 32, 34, 36 and 38 are connectable in series and series parallel relationship with the gap according to the selective energization of one or more of a set of control relays A, B, C, D or E as shown. The outputs of a current control system 40 are used to selectively energize the relays A-E according to the control output provided from the current control system 40. The manner in which the current control system 40 operates will be explained hereinafter in connection with the logic schematic of FIGS. 2–4. The current control system 40 is shown in FIG. 1 in block form with the several inputs provided representative of the frequency settings of the multivibrator 20 through a switch 54 and a corresponding deck switch 54a and with the other inputs received representative of the pulse on-time, i.e. current magnitude, preset for multivibrator 20 through a corresponding deck switch 56a. The power supply illustrated in the drawing of FIG. 1 includes provision for 10 different frequency or tap settings and at least a like number of current magnitude settings.

Attention now will be given to the mode of operation of the multivibrator 20 and the manner in which the inputs of the current control system 40 were taken in accordance with the frequency and on-time settings used to control multivibrator operation. The multivibrator 20 includes as its major component a pair of alternately operable transistors 42 and 46, each of which has coupled to it a Darlington connected transistor 48, 50 to increase the magnitude of the power output. In accordance with normal astable multivibrator design, the frequency of operation is controlled by the relative magnitude of the resistor-capacitor combinations. In the return networks, as indicated in FIG. 1, there are ten frequency settings indicated by the letters $S_1 - S_{10}$. Frequency is selected by the operation of the ganged switches 52 and 54. The current magnitude of the machining power pulses is controlled by the setting of the two potentiometers 56 and 58 which typically may be ganged for operation. In the embodiment shown, the lower frequency settings have their on-off time controlled by the potentiometer 56, while the higher frequency settings at the lower portion of the diagram are controlled by the setting of the potentiometer 58.

The output for the drive stage 22 and the subsequent electronic output switch stage, including the transistors 12, 14, is taken from the collector of the transistor 46. A reduced number of frequency inputs — five in number — are taken from the wafer deck switch 54a which switch is operated in conjunction with switches 52, 54 in such manner that frequency inputs $F_1 - F_5$ are available to the current control system 40 at the same time that a plurality of current magnitude inputs are provided through the terminals identified as $C_1 - C_{10}$ in accordance with the current magnitude or on-time settings which have been made controlling the multivibrator operation through potentiometers 56 and 58. The multivibrator 20 further has its own DC voltage source 59, with series resistors 59, 61 connected in the manner shown and with diodes 62, 64 poled to permit current flow in the directions indicated.

The manner in which the system operates will now be explained with particular reference to the schematic drawing of FIG. 2. The FIG. 2 drawing shows the inputs taken at the left hand side of the drawing. Each input is received through a filter network comprising a capacitor 70 and a resistor 72. With respect to the various gating devices used in the drawings of FIGS. 2, 3 and 4, these are preferably integrated circuit positive logic gates of the NOR type currently used in the art. With respect to certain of the components illustrated, for example, the two-input gates numbered 101, 103 through 110, 112, 116 through 119, these are of the type manufactured and sold by Motorola, Inc. and designated by their Model No. MC724P. With respect to the three-input gating devices numbered 101 and 111 in FIGS. 2-4, these may be devices of the type manufactured and sold by Motorola, Inc. and designated by their Model No. MC792P. Finally, with respect to FIGS. 2-4, the four-input logic devices indicated by the numerals 113, 114 and 115 may be of the type designated Model No. MC725P likewise currently manufactured and sold by Motorola, Inc.

Figure 2:
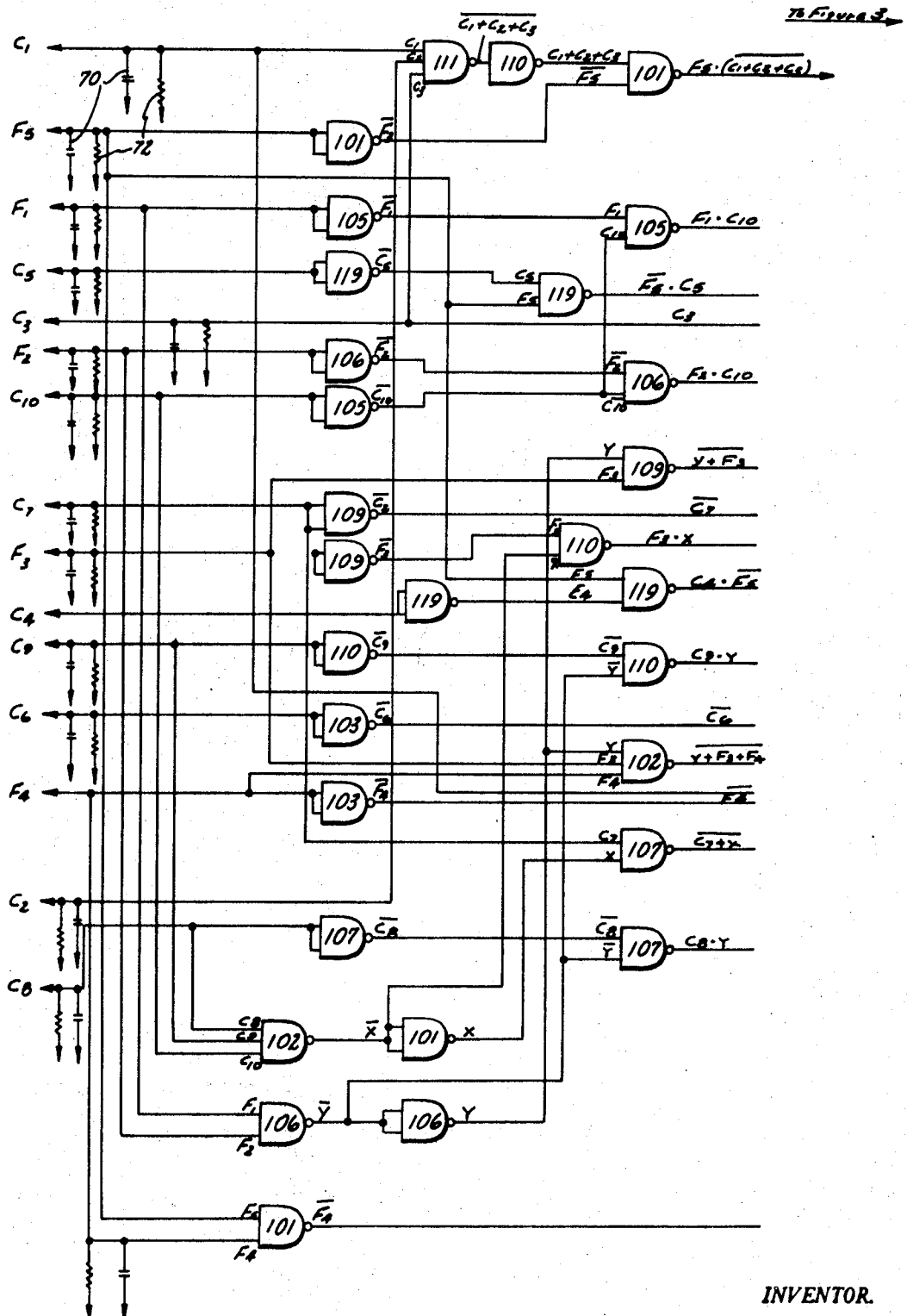
FIGS. 2, 3 and 4 are schematic drawings of the current control system used.
Figure 3:
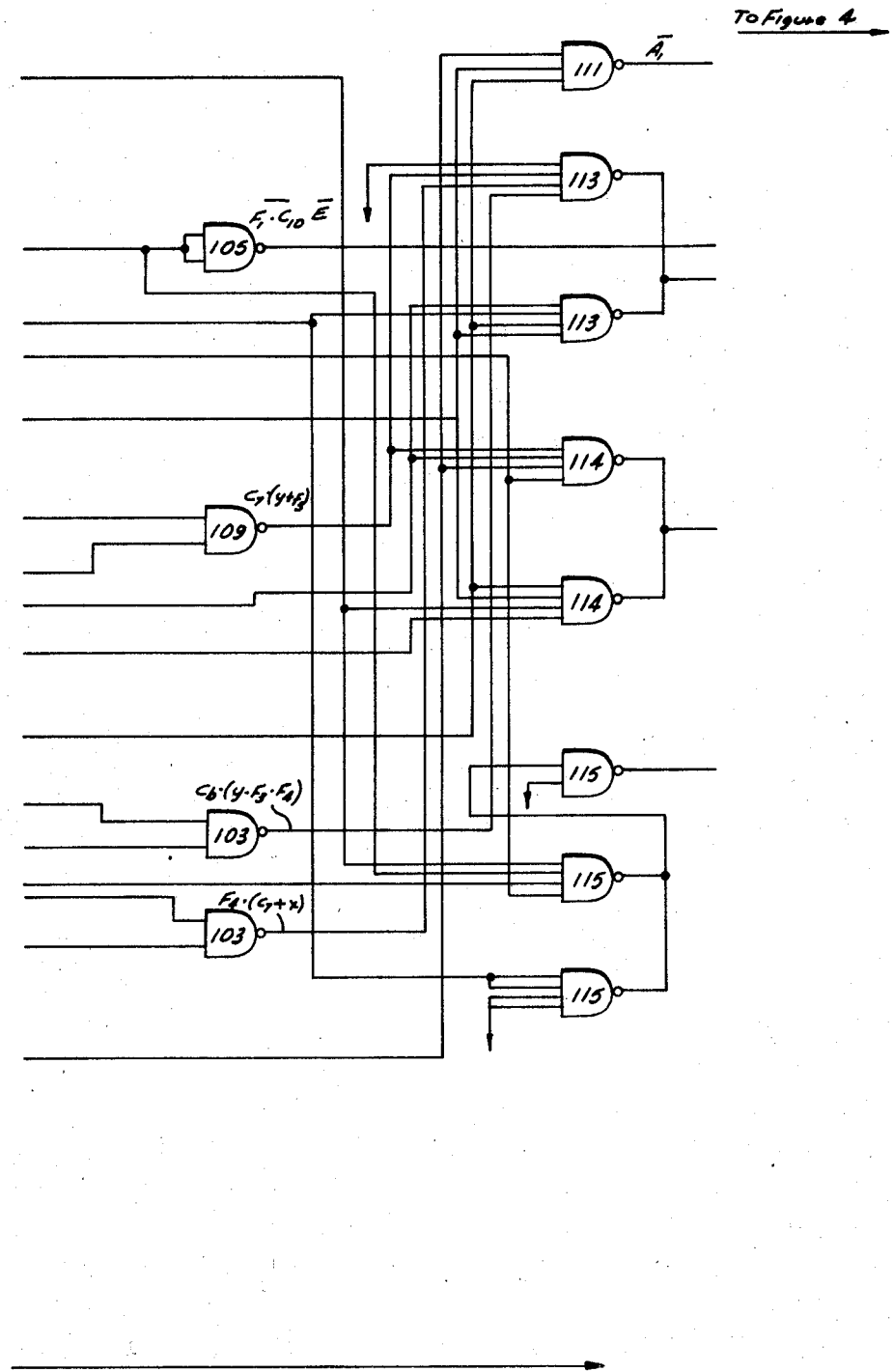
Figure 4:
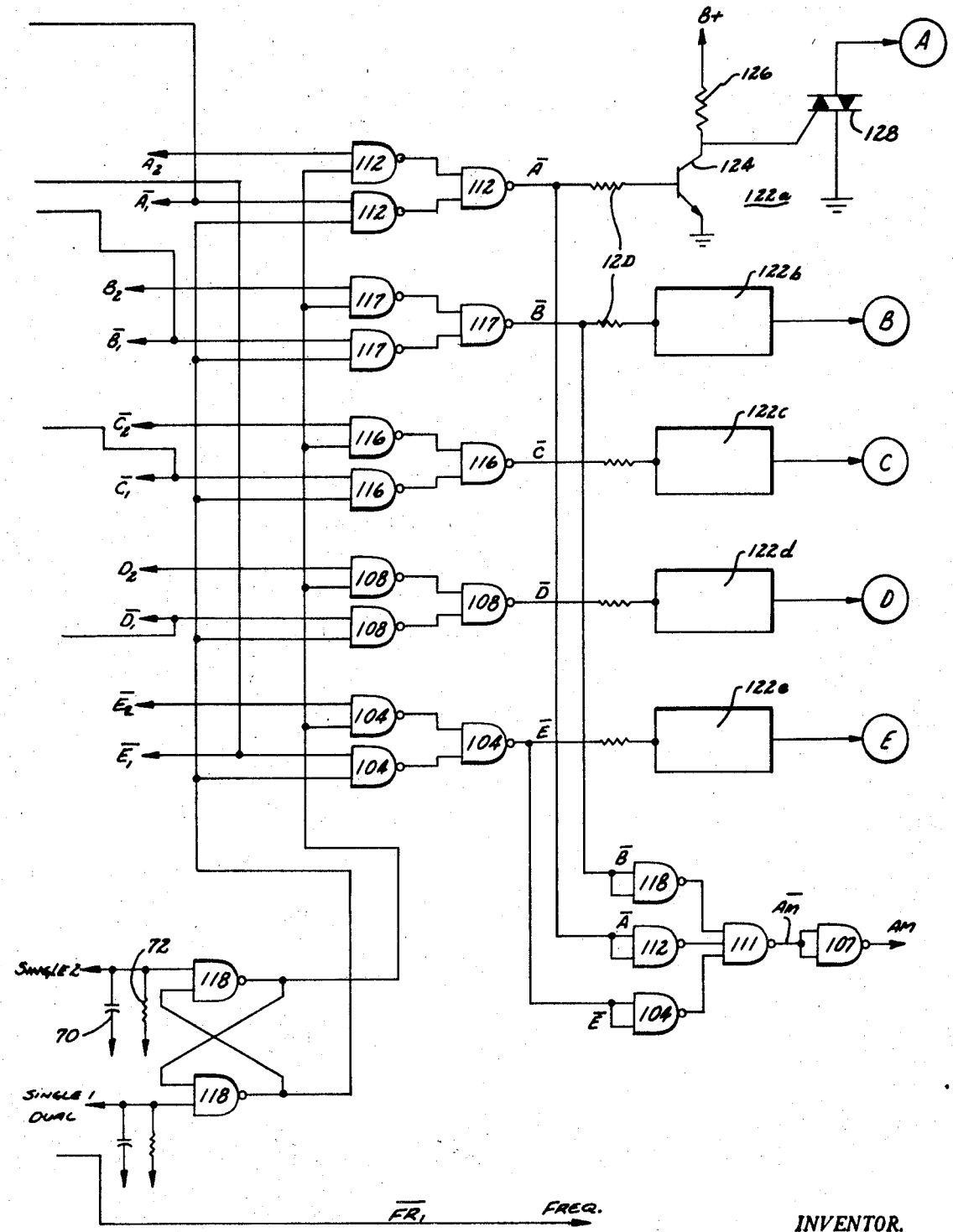

The following are equations using conventional symbols and representing the logic used in the current control system of FIGS. 2-4:

$A$ = Relay Combinations  $C$ = Current Limit Settings $F$ = Frequency Switch Settings $A_1 = C_1$
$A_2 = C_2$
$A_3 = C_3 + F_5 \cdot (\overline{C}_1 + \overline{C}_2 + \overline{C}_3)$
$A_4 = C_4 \cdot \overline{F}_5$
$A_5 = C_5 \cdot \overline{F}_5$
$A_6 = C_6 \cdot (F_1 + F_2 + F_3) + F_4 \cdot (C_8 + C_9 + C_{10})$
$A_7 = C_7 \cdot (F_1 + F_2 + F_3) + (C_8\ C_9\ C_{10}) \cdot F_3$
$A_8 = C_8 \cdot (F_1 + F_2)$
$A_9 = C_9 \cdot (F_1 + F_2) + F_2 \cdot C_{10}$
$A_{10} = F_1 \cdot C_{10}$ $Y$ and $Z$ are used to simplify the above equations as follows:

$Y = F_1 + F_2$
$Z = C_8 + C_9 + C_{10}$
$X_1 = C_8 \cdot Y + C_9 \cdot Y + F_2 \cdot C_{10}$
$X_2 = C_5 \cdot \overline{F}_5 + C_6 \cdot (Y + F_3 + F_4) + F_4 \cdot (C_8 + C_9 + C_{10}) + C_7 \cdot (Y + F_3) + F_3 \cdot Z + C_9 \cdot Y + F_2 \cdot C_{10}$
$X_3 = C_3 + F_5 \cdot (\overline{C}_1 + \overline{C}_2 + \overline{C}_3) + (C_4 \cdot \overline{F}_5) + C_7 \cdot (Y + F_3) + (F_3 \cdot Z)\ C_8 \cdot Y + C_9 \cdot Y + F_2 \cdot C_{10}$
$\overline{X}_4 = A_1 + A_3 + A_5 + A_{10} = C_4 \cdot \overline{F}_5 + C_3 + F_5 \cdot (\overline{C}_1 + \overline{C}_2 + \overline{C}_3)\ C_5 \cdot \overline{F}_5 + F_1 \cdot C_{10}$
$X_5 = F_1 \cdot C_{10}$ The manner in which the various gating devices operate to convert the input signals representative of the frequency and current magnitude are shown step by step as the signals are processed through the circuits of FIGS. 2 and 3. In each case, the input or inputs and the output are identified for each gating element or they are readily recognizable from the input leads associated with each such gating device.

The final outputs from current control system 40 are shown in FIGS. 2 and 3 and then indicated as they are used to exercise a control function by the circuit of FIG. 4. The outputs indicated at the right side of the FIG. 4 drawing as frequency control outputs are all utilized in drive circuits which are identified by the numerals 122a through 122e. The drive circuits 122a-122e actuate the solenoids A, B, C, D and E which have already been shown in the schematic of FIG. 1. Relay sequencing of the relays A through E as it is used to control the different resistor connections within the variable impedance means 24 is best illustrated by the following tabular representation and equations:

RELAY SEQUENCING — RELAYS A - E

| Current Limit Switch Setting | $X_1$ | $X_2$ | $X_3$ | $X_4$ | $X_5$ |
|---|---|---|---|---|---|
| $C_1$ | 0 | 0 | 0 | 0 | 0 |
| $C_2$ | 0 | 0 | 0 | 1 | 0 |
| $C_3$ | 0 | 0 | 1 | 0 | 0 |
| $C_4$ | 0 | 0 | 1 | 1 | 0 |
| $C_5$ | 0 | 1 | 0 | 0 | 0 |
| $C_6$ | 0 | 1 | 0 | 1 | 0 |
| $C_7$ | 0 | 1 | 1 | 1 | 0 |
| $C_8$ | 1 | 0 | 1 | 1 | 0 |
| $C_9$ | 1 | 1 | 1 | 1 | 0 |
| $C_{10}$ | 0 | 0 | 0 | 0 | 1 |

$X_1$ = 0.5 ohm A Relay )
$X_2$ = 1 ohm B Relay )
$X_3$ = 2 ohms C Relay )   FROM FIG. 1a $X_4 = 5$ ohms D Relay )
$X_5 = 0$ ohm E Relay )

From Chart above;
 $X_1$ energizes when combinations
 $A_8 + A_9$ are possible.
 $X_1 = A_8 + A_9$
 $X_2 = A_5 + A_6 + A_7 + A_9$
 $X_3 = A_3 + A_4 + A_7 + A_8 + A_9$
 $X_4 = A_2 + A_4 + A_6 + A_7 + A_8 + A_9$
 $X_5 = A_{10}$ It will be seen from the above table that one example of the magnitudes of resistors for use in the control system may be given as follows: resistors 26, 28, 30, 32, 34 — 1 ohm; resistor 36 — 5 ohms; and resistor 38 — 25 ohms. These values are to be taken by way of example and not considered as a limitation with respect to this feature.

Again with further reference to the drawing of FIG. 4, it will be seen that for each solenoid A–E there is provided the drive circuit 122a–122e, each including a drive transistor 124 which has its principal electrodes connected in series with a suitable positive voltage source and a resistor 126. The output from drive transistor 124 is taken from its emitter and used to fire an associated solid state triac switch 128. The output of the triac switch 128 is used to directly actuate one of the solenoids A–E. In addition to the firing of the four resistor controlling solenoids A–E, additional logical control functions, for example, to connect an ammeter Am in circuit.

Reference is now made to FIG. 1 and to clarify the operation of the variable impedance network 24 as it is finally controlled by the output from the current control system 40. The values of the various resistors 26 through 38 have already been indicated hereinabove. The normally open contacts, closed through the operation of the several solenoids A–E, are identified by corresponding letters attached to the contact for each. Thus it will be seen that as the frequency of operation of the power supply is increased and as the current magnitude and thus the length of on-time is increased, there will be a significant change in the series resistance value that is included in circuit with the gap.

Now with reference to FIG. 4, it will be seen that a provision is made in the current control logic system for providing a control input depending on whether the power supply is being operated as a single power or whether a pair of power supplies are being operated at the same time, that is, in parallel to a single machining gap with one or more electrodes used at the same time to machine one or more workpieces. For this purpose, the gates 118 are connected as shown, whereby the current control circuit is permitted to inhibit its own inputs and used to accept input signals from a second power supply, thus commanding the resistor combination which is appropriate in relation to the other input.

It will thus be seen that the present invention provides a novel and highly effective current control system which has the function of predetermining and connecting the appropriate series resistance in accordance with the frequency at which the power supply is preset and in further dependence on the current magnitude that has been programmed.

What is claimed is:

1. In an electrical discharge machining apparatus operable to provide machining power pulses of independently variable current and frequency across a machining gap;
 a current control system including a plurality of different magnitude resistors connectable in series with said gap;
 a first switching means presettable to provide a predetermined pulse frequency;
 a second switching means presettable to provide a predetermined gap current; and
 means for combining signals representative of both the aforesaid settings and deriving a control output for connecting different ones of said resistors in series with the gap to provide a maximum gap current level corresponding to each frequency setting;
 said means for combining signals comprising a plurality of gating means connected in cascade and operable to provide said output to maintain the desired current level.

2. The combination as set forth in claim 1 wherein said switching means comprise a pair of deck switches, each selectively positionable in accordance with the selected pulse frequency and pulse current, respectively.

3. The combination as set forth in claim 1 wherein a plurality of independently actuable relays are included for controlling the connection of said resistors with the gap.

4. The combination as set forth in claim 1 wherein said gating devices are of the integrated circuit type incorporating resistor-transistor logic elements.

5. An electrical discharge machining apparatus including means for providing machining power pulses of independently variable current magnitude and frequency to a machining gap, a current control system including:
 a plurality of resistors selectively connectable in series with said gap;
 a pulsing means for generating said power pulses including a first switching means presettable to provide a predetermined pulse frequency and a second switching means presettable to provide a predetermined gap current magnitude;
 means for combining signals representative of both the aforesaid settings comprising, a plurality of gating devices operably connected in sequence;
 a plurality of relays, each corresponding to one of said resistors and controlling its series connection with said gap; and
 means connected to the output of said combining means for providing a control output to said relays for actuating them to provide a maximum current level for each different frequency and current setting.

6. The combination as set forth in claim 5 wherein said pulsing means comprises an astable multivibrator, said multivibrator including a pair of alternately operated switches, each having connected to it a variable resistor-capacitor network, wherein said first switching means is operable to select the capacitor magnitude and wherein said second switch is operable to select the resistor magnitude.

7. A combination as set forth in claim 5 wherein both said first and second switching means comprise a deck type manually positionable switch.

8. The combination as set forth in claim 5 wherein each of said gating devices is of the integrated circuit type and of the resistor-transistor configuration.

9. An electrical discharge machining apparatus operable to provide machining power pulses of independently adjustable current and frequency, the combination comprising:
 an electric output switch having one of its principal electrodes operatively connected to the machining gap;
 a current control system including a plurality of resistors selectively connectable in series with said machining gap and said principal electrode;
 pulsing means for operating said electronic switch;
 a first switching means connected to said pulsing means and presettable to provide a predetermined pulse frequency for said pulsing means;
 a second switching means connected to said pulsing means and presettable to provide a predetermined pulse current for said pulsing means; and
 a means for combining signals representative of both the aforesaid settings and providing a control output for connecting different ones of said resistors to provide a maximum gap current level corresponding to each frequency setting said signal combining means comprising a plurality of gating devices connected in cascade and operable to provide said control output to maintain the desired level of current magnitude.

10. The combination as set forth in claim 9 wherein a plurality of relays are included for connecting said resistors in series with the gap and said electronic output switch principal electrode.

11. In an electrical discharge machining power supply operable to provide machining power pulses of independently variable frequency and current magnitude to the gap, a current control system comprising:
 a first means presettable to provide a predetermined pulse frequency;
 a second means presettable to provide a predetermined gap current magnitude;
 a read-out means operatively connected to said first and second means for providing a signal representative of their respective settings;
 said read-out means comprising a deck switch corresponding to each of said first and second means and positioned in accordance therewith;
 means for combining the aforesaid signals and providing a control output signal; and
 a variable impedance means connected in series with said gap and controlled by said control output signal for maintaining a maximum current level corresponding to each combination of frequency and current magnitude setting
 said means for combining signals comprising a plurality of gating devices of the resistor-transistor logic type connected in cascade.

12. The combination as set forth in claim 11 wherein said variable impedance means comprises a plurality of resistors selectively connectable in circuit with said gap.

13. The combination as set forth in claim 12 wherein a plurality of relays, each corresponding to at least one of said resistors, are connected between said gating devices and said gap for connecting said resistors to said gap.

14. In an electrical discharge machining apparatus operable to provide machining power pulses of variable frequency and on-time to the gap, a current control system comprising:
 a first means presettable to provide a predetermined pulse frequency;
 a second means presettable to provide predetermined pulse on-time;
 a read-out means operatively connected to said first and second means for providing a signal representative of their respective settings;
 means for combining the aforesaid signals to provide a control output signal comprising a plurality of gating devices connected in cascade; and
 a variable impedance means connected in series with said gap and controlled by said control output signal for maintaining a maximum current level corresponding to each preset combination of frequency and on-time setting.

* * * * *